United States Patent
Hodges

(10) Patent No.: US 12,065,362 B2
(45) Date of Patent: *Aug. 20, 2024

(54) VACUUM ASSISTED LIQUID SEPARATION SYSTEM

(71) Applicant: Daniel Hodges, Novi, MI (US)

(72) Inventor: Daniel Hodges, Novi, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/301,339

(22) Filed: Apr. 17, 2023

(65) Prior Publication Data

US 2023/0249990 A1    Aug. 10, 2023

Related U.S. Application Data

(63) Continuation of application No. 17/374,090, filed on Jul. 13, 2021, now Pat. No. 11,629,069.

(60) Provisional application No. 63/052,057, filed on Jul. 15, 2020, provisional application No. 63/198,446, filed on Dec. 21, 2020.

(51) Int. Cl.
| | |
|---|---|
| *C02F 1/14* | (2023.01) |
| *B01D 1/00* | (2006.01) |
| *B01D 3/10* | (2006.01) |
| *C02F 1/04* | (2023.01) |
| *F16L 59/065* | (2006.01) |

(Continued)

(52) U.S. Cl.
CPC ............. *C02F 1/14* (2013.01); *B01D 1/0017* (2013.01); *B01D 1/0035* (2013.01); *B01D 3/10* (2013.01); *C02F 1/04* (2013.01); *C02F 1/043* (2013.01); *C02F 1/046* (2013.01); *C02F 1/048* (2013.01); *F16L 59/065* (2013.01); *B01D 5/006* (2013.01); *C02F 2103/08* (2013.01); *C02F 2301/063* (2013.01)

(58) Field of Classification Search
CPC . C02F 1/04–18; B01D 1/0029; B01D 1/0035; B01D 1/28–2896; A47J 41/02; A47J 41/022; A47J 41/024; A47J 41/026; A47J 41/028; F16L 59/065; F24S 10/40; F24S 10/45

See application file for complete search history.

(56) References Cited

U.S. PATENT DOCUMENTS

| | | | |
|---|---|---|---|
| 1,575,309 A | 3/1926 | Anderson | |
| 1,989,999 A * | 2/1935 | Niederle | F24S 20/20 |
| | | | 126/573 |

(Continued)

FOREIGN PATENT DOCUMENTS

WO    2020190995 A1    9/2020

OTHER PUBLICATIONS

International Search Report and Written Opinion for International Application No. PCT/US2022/036764 mailed Oct. 12, 2022.

(Continued)

*Primary Examiner* — Jonathan Luke Pilcher
(74) *Attorney, Agent, or Firm* — Carlson, Gaskey & Olds, P.C.

(57) ABSTRACT

A liquid separation system includes an inner chamber and an outer chamber disposed at least partially around the inner chamber. A vacuum source in communication separately with the inner chamber and the outer chamber controls a pressure within the inner chamber separately from the outer chamber for controlling conversion of liquid within the inner chamber to a gas.

11 Claims, 5 Drawing Sheets

(51) Int. Cl.
*B01D 5/00* (2006.01)
*C02F 103/08* (2006.01)

(56) References Cited

U.S. PATENT DOCUMENTS

| | | | |
|---|---|---|---|
| 2,141,330 | A | 12/1938 | Abbot |
| 3,270,769 | A | 9/1966 | Kaiser et al. |
| 3,527,676 | A * | 9/1970 | Hingst .................. C02F 1/06 |
| | | | 159/17.4 |
| 4,504,362 | A * | 3/1985 | Kruse .................... F03G 6/06 |
| | | | 202/180 |
| 4,505,263 | A | 3/1985 | Nameda et al. |
| 4,680,090 | A * | 7/1987 | Lew ...................... C02F 1/14 |
| | | | 202/205 |
| 4,921,580 | A | 5/1990 | Martes et al. |
| 6,058,718 | A | 5/2000 | Forsberg et al. |
| 10,183,233 | B1 | 1/2019 | Haidar |
| 11,629,069 | B2 * | 4/2023 | Hodges ................. B01D 3/10 |
| | | | 202/234 |
| 2002/0053507 | A1 | 5/2002 | Belmar |
| 2007/0245730 | A1 | 10/2007 | Mok |
| 2010/0319680 | A1 | 12/2010 | Kelly |
| 2011/0174605 | A1 | 7/2011 | Ugolin |
| 2012/0112473 | A1 * | 5/2012 | Glynn .................. B01D 1/0035 |
| | | | 290/1 R |
| 2013/0025587 | A1 * | 1/2013 | Lopez Ferrero ........ F24S 10/45 |
| | | | 126/684 |
| 2013/0219888 | A1 | 8/2013 | Yang et al. |
| 2014/0027268 | A1 | 1/2014 | Ljunggren |
| 2015/0114818 | A1 | 4/2015 | Prince et al. |
| 2015/0298991 | A1 | 10/2015 | Salama |
| 2016/0123628 | A1 | 5/2016 | Kerns et al. |
| 2016/0229706 | A1 | 8/2016 | Ackerman |
| 2019/0351347 | A1 | 11/2019 | Antar et al. |
| 2021/0206658 | A1 | 7/2021 | Budil |

OTHER PUBLICATIONS

International Preliminary Report on Patentability for International Application No. PCT/US2022/036764 mailed Jan. 25, 2024.

* cited by examiner

VACUUM ASSISTED LIQUID SEPARATION SYSTEM

CROSS REFERENCE TO RELATED APPLICATION

This application is a continuation-in-part of U.S. application Ser. No.: 17/374,090 filed Jul. 13, 2021, now U.S. Pat. No. 11,629,069, that claims priority to Provisional Application Nos. 63/052,057 filed on Jul. 15, 2020 and 63/198,446 filed on Oct. 19, 2020.

TECHNICAL FIELD

The present disclosure relates to a system for separating liquids from a solution using heat to vaporize and separate liquids from other components of the solution.

BACKGROUND

According to the World Health Organization, roughly half of the world's population will live in water stressed areas by 2025. The predominant methods of water distillation either use a lot of power to increase their clean water output or focus solely on solar energy for steam distillation. Systems for each method require a large initial investment and expensive continued maintenance. Other common processes such as reverse osmosis require large amounts of energy to remove enough salt from water to reach potable levels. The more salt in the water, the more energy required for its removal. Water influent to the system from oceanic sources typically requires pretreatment to remove certain contaminants. Accordingly, a need exists for systems that economically and efficiently provide clean potable water The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A liquid separating system according to a disclosed example embodiment includes, among other possible things, an inner chamber including a liquid inlet, a gas outlet and a discharge, an outer chamber disposed at least partially around the inner chamber, a heating device is in thermal communication with the inner chamber, and a vacuum source is in communication separately with the inner chamber and the outer chamber. The vacuum source provides for the control of pressure within the inner chamber separately from the outer chamber for controlling conversion of liquid within the inner chamber to a gas. Generation of a negative pressure lowers the temperature at which water will vaporize in the inner chamber such that heating device is sufficient to vaporize liquid within the inner chamber.

A method of sanitizing water according to another disclosed example embodiment includes, among other possible things, filling an inner chamber with a liquid containing contaminants, sealing the inner chamber, sealing an outer chamber at least partially surrounding the inner chamber, reducing a pressure within the inner chamber to a pressure below an ambient pressure, reducing a pressure within the outer chamber to a pressure below an ambient pressure separate from the pressure within the inner chamber, heating liquid within the inner chamber to transform at least a portion of the liquid into a gas and, exhausting the gas from the inner chamber in a controlled manner to maintain transformation of liquid into gas and condensing the exhausted gas into a liquid form outside of the inner chamber.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
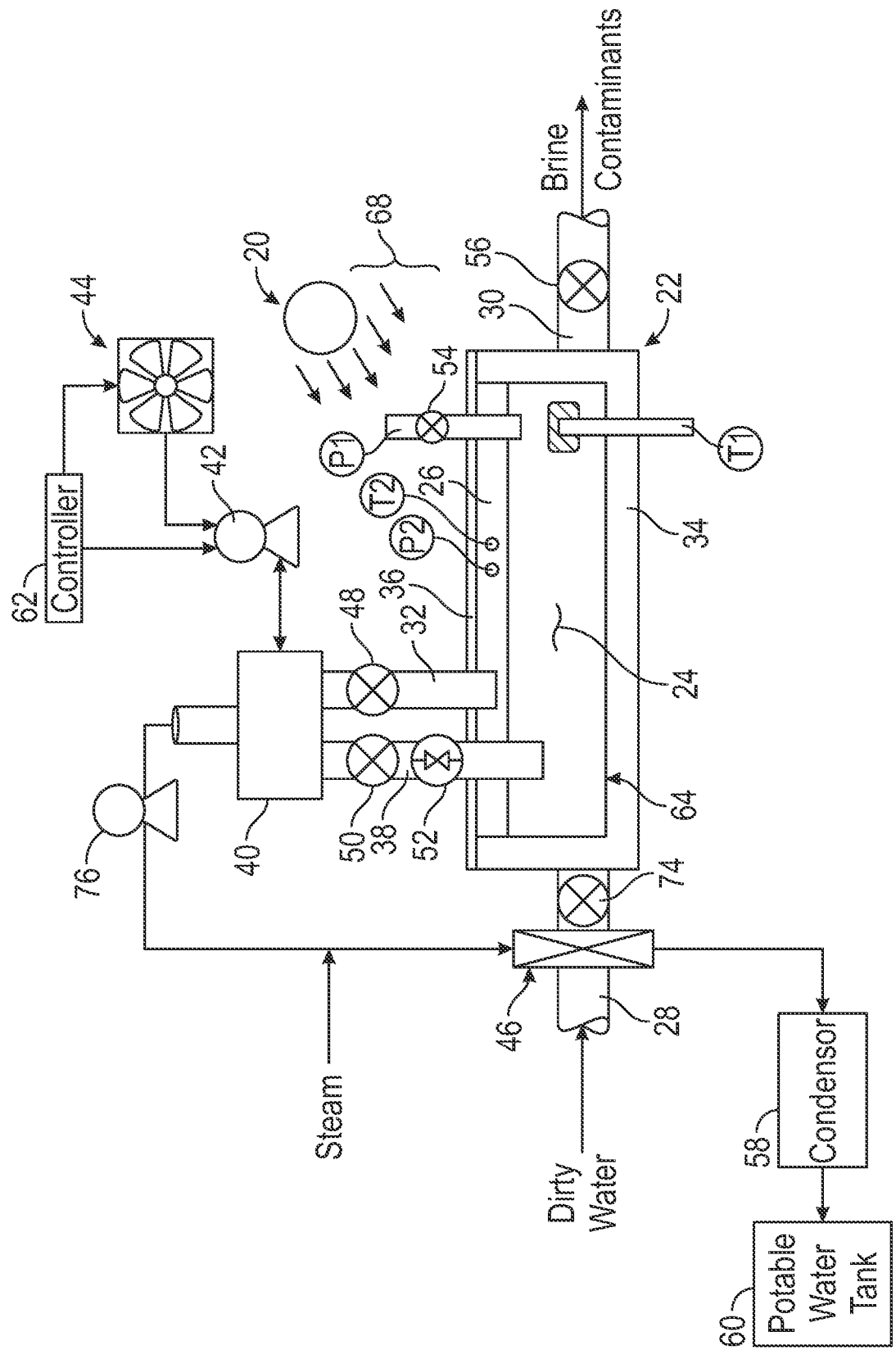
FIG. 1 is a schematic view of an example embodiment of a system for sanitizing water.

Referring to FIG. 1, a system for sanitizing water is schematically shown and indicated at 20. The system 20 uses solar energy to generate sufficient heat to boil water within an inner chamber 24 to separate contaminants. The term contaminant is used in this disclosure to refer to bacteria, salt and any other undesired particle disposed within the water. A pressure within the inner chamber 24 is controlled to govern the temperature required to boil the water. The system 20 is useful for sanitizing contaminated water and for removing salt from salt water to generate potable water. The inner chamber 24 is part of a solar energy concentrator 22 that focuses solar energy onto the inner chamber 24 to provide the thermal energy needed to boil water. A negative pressure is generated in the inner chamber 24 that results in a lowering of the temperature at which water vaporizes such that the solar energy is capable of elevating the temperature of water to the vaporization point. Accordingly, the disclosed system 20 provides for the efficient, economical, and practical sanitization of water.

The energy concentrator 22 includes the inner chamber 24 and an outer chamber 26. The inner chamber 24 and the outer chamber 26 are supported within a tray 34. The disclosed example inner chamber 24 is a hollow tube 25. The outer chamber 26 is defined by a structure 27 that surrounds the inner chamber 24 and provides an insulating vacuum around the inner chamber 24. The hollow tube 25 includes an inlet 28 for receiving dirty contaminated water into the inner chamber 24. A discharge outlet 30 provides for the removal of brine, contaminants and any other particles left behind within the inner chamber 25 once the water is removed.

The inner chamber 24 is also in communication with a vacuum source, such as the example vacuum pump 42. A vacuum conduit 38 is in communication with the inner chamber 24 and a manifold 40. The vacuum pump 42 is also in communication with the outer chamber 26 through a conduit 32. The manifold 40 provides passages and conduits to communicate with both the inner chamber 24 and the outer chamber 26 separately. A pressure within the inner chamber 24 is controlled separate from the pressure within the outer chamber 26. Vacuum within the outer chamber 26 provides an insulating function that provides for a substantial reduction and/or prevention of heat loss from the inner chamber 24.

The manifold 40 provides the conduits and valving required to provide the separate control of pressures within each of the chambers 24, 26.

The manifold 40 further provides an outlet for gases from the inner chamber 24. As water transforms into steam, it is passed through the conduit 38 and to a condenser 58. In the condenser 58, the steam is cooled and transformed back to a liquid form and routed to a potable water tank 60.

Steam exhausted from the inner chamber 24 has a significant amount of thermal energy and may be utilized to preheat water entering the inner chamber 24. In this example embodiment, a heat exchanger 46 provides for steam to be in thermal communication with water in the inlet pipe 28 to preheat water. The heat exchanger 26 may also be utilized to transfer thermal energy into other parts of the example system 20, or other systems.

The example system 20 uses an electric powered pump 42 and therefore requires some electric energy input. The electric energy to drive the pump 42 may come from an outside source or any other source of electric energy. In one disclosed embodiment, a windmill 44 is provided to drive a generator that provides electricity to power the pump 42. The use of a windmill 44 to provide electric energy provides for implementation of the system 20 in areas that lack an energy infrastructure.

Figure 2:
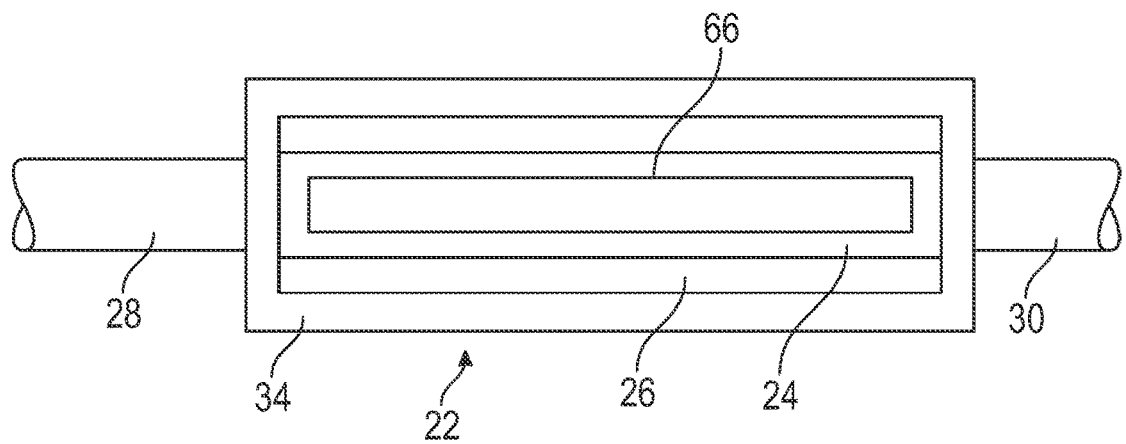
FIG. 2 is a top schematic view of an example embodiment of a solar energy concentrator.
Figure 3:
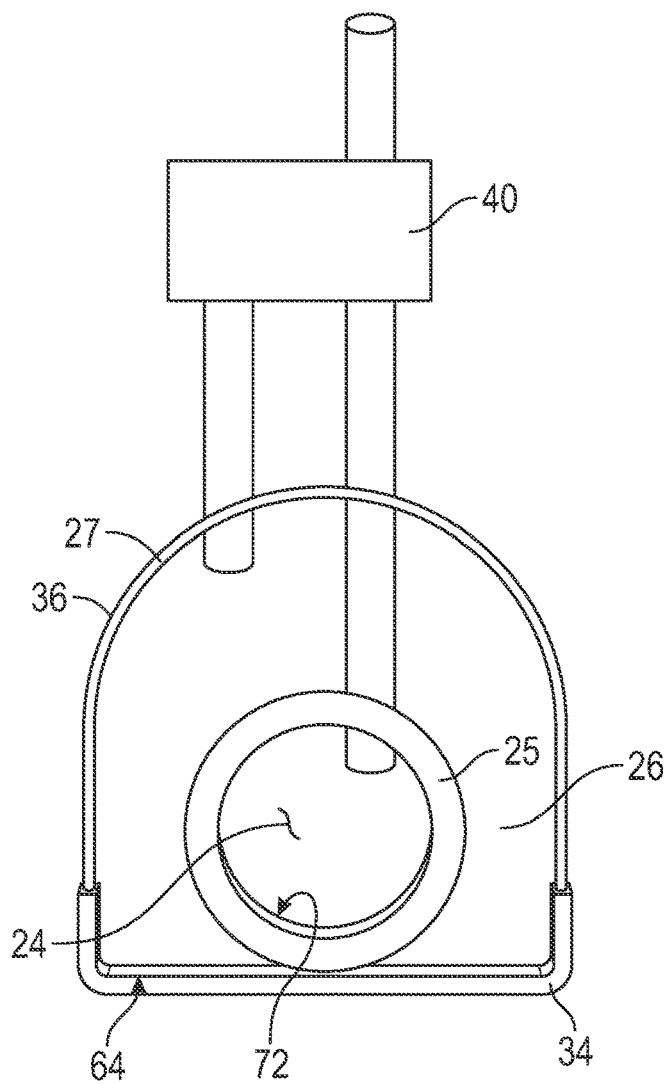
FIG. 3 is a side view of the example solar energy concentrator.
Figure 4:
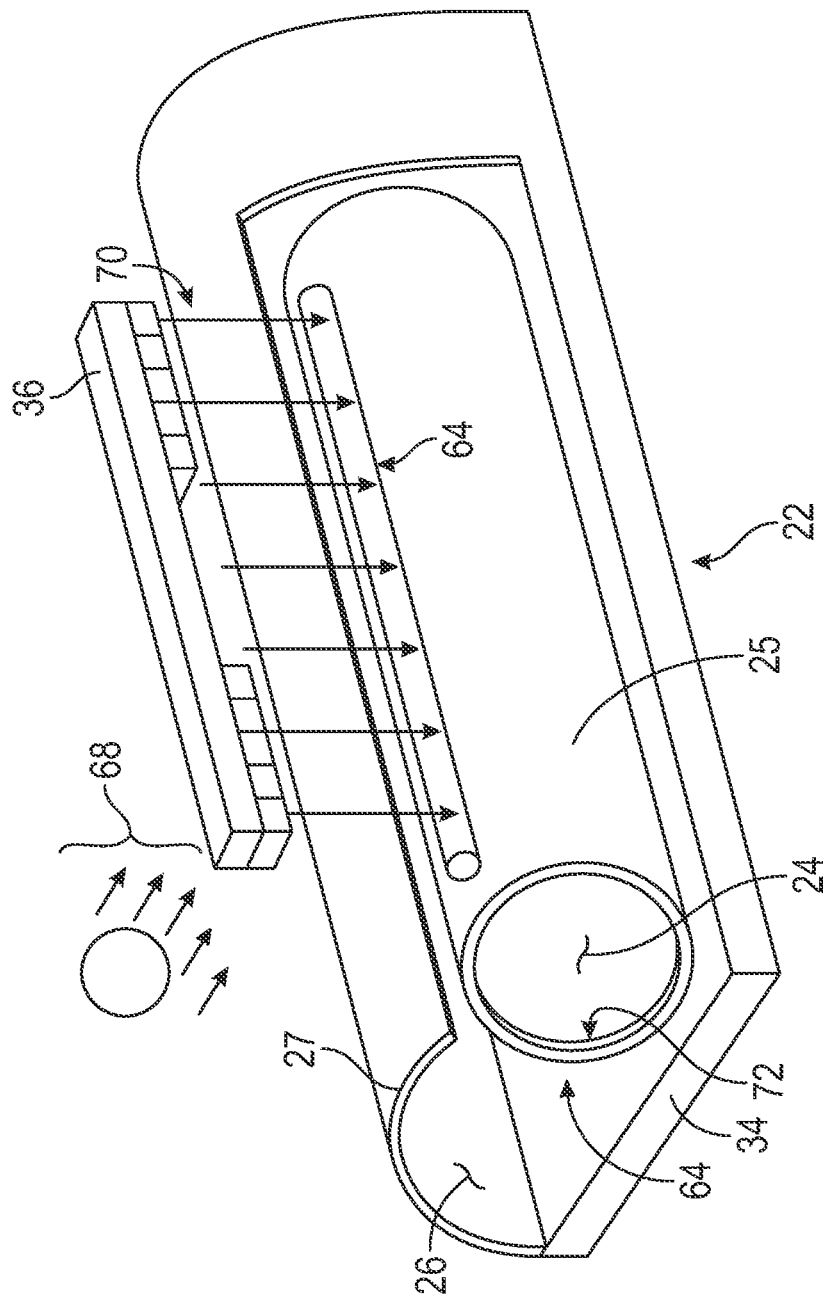
FIG. 4 is a partial perspective view of the example solar energy concentrator.

Referring to FIGS. 2, 3 and 4 with continued reference to FIG. 1, the solar energy concentrator 22, includes a lens 36 that focus solar energy onto the contents of the inner chamber 24. In one example embodiment, the lens 36 is Fresnel lens. Moreover, in another disclosed example embodiment, the lens 36 is an integrated portion of the structure 27 defining the outer chamber 26. Although a Fresnel lens 36 is disclosed by way of example, other lens configurations that focus solar energy onto the contents of the inner chamber 24 may be utilized within the scope and contemplation of this disclosure. For example, the lens 36 may be a Fresnel linear mirror, a parabolic trough solar concentrator or a linear heliostat solar concentrator.

The tray 34 includes a dark coating 64 to absorb thermal energy surrounding the inner chamber 24. The hollow tube 25 that defines the inner chamber 24 includes a reflective coating 72 to reflect solar energy within the inner chamber 24. Solar energy schematically indicated at 68 is focused by the lens 36 through a transparent portion 66 of the hollow tube 25 into the inner chamber 24. The transparent portion 66 is an area of the hollow tube 25 that is not coated with the reflective coating 72. Solar energy input through the portion 66 is reflected within the inner chamber 24 to generate the heat needed to boil off the water. The structure 27 defining the outer chamber 26 surrounding the inner chamber 24 may also include reflective coatings to further direct solar energy into the inner chamber 24.

Pressure and temperatures are controlled within each of the inner chamber 24 and the outer chamber 26. A pressure P1 and a temperature T1 within the inner chamber 24 is controlled to tailor conditions to boil the water. A pressure P2 and a temperature T2 within the outer chamber 26 is controlled separately from the inner chamber 24.

A controller 62 is provided and is configured to control operation of the system 20 to transform water into steam within the inner chamber 24. The controller 62 in communication control devices of the system to adjust and tailor water removal to existing conditions. A first control valve 50 controls flow through outlet 38 between the manifold 40 and thereby the vacuum pump 42 and the inner chamber 24. A check valve 52 is also provide in the outlet 38 to enable one way flow out of the inner chamber 24. A second control valve 48 controls flow through outlet conduit 32. A third control valve 56 closes off the discharge 30 and a fourth control valve 74 closes off the inlet 28. The system also includes a relief valve 54 in communication with the inner chamber 24. The relief valve 54 is operable to control the pressure P1 within the inner chamber 24.

Operation of the system 20 begins by filling the inner chamber 24 with water that contains contaminants that are to be removed. The contaminants may be bacteria, salt or any other undesirable particles and substances that renders the water unusable for consumption. Sanitation of the water is performed as a batch process. A quantity of water fills the inner chamber 24 to a desired level. The quantity of water filled within the inner chamber 24 is dependent on many conditions and operational parameters. Such conditions and parameters can include the condition of the water, the outside temperature, and the availability of solar energy among other possible things.

In one disclosed embodiment, the inner chamber 24 is filled approximately half of the volume and the control valves 74 and 56 are closed to seal the inner chamber 24. The pump 42 or other vacuum source is then activated and begins lowering a pressure within the inner chamber 24. Lowering the pressure is performed by operation of the control valve 50 in a manner that establishes a vacuum in the inner chamber 24. As appreciated, the temperature at which water boils and transforms into steam is dependent on pressure. At ambient conditions, water will boil at around 100° C. As the pressure is reduced and a negative pressure is imposed, the temperature required to transform water into steam becomes much lower. For example, at a vacuum of approximately 0.51 psia, water will boil at 26.7° C., a hot sunny day. At an increased vacuum of approximately 0.18 psia, water will boil at 10° C., approximate groundwater temperature in the U.S.

As the pressure is reduced, the inner chamber 24 is exposed to solar energy that heats the water. The lens 36 focuses this energy into the inner chamber 24 as indicated at 70 in FIG. 4. The reflective coatings 72 and 64 enable a magnification of the thermal energy that heats the water. The controller 62 operates the control valve 54 to maintain pressure P1 and temperature T1 within the inner chamber 24. As water is transformed to steam, the steam is exhausted through the conduit 38 and out of the inner chamber 24. The controller 62 operates the pump 42, control valve 50 and control valve 54 to maintain conditions in the inner chamber 24 as water is boiled off and removed through the conduit 38. The process is continually monitored and with pressure and temperature sensors disposed in the inner chamber 24 until all or a desired amount of water is boiled off and removed from the chamber 24.

The pressure P2 within the outer chamber 26 is also drawn down to increase insulating properties and capacities of the space surrounding the inner chamber 24. Insulating the inner chamber 24 reduces heat loss to maintain thermal energy utilized for heating and transforming water into steam.

The steam evaporated from the inner chamber 24 is drawn into a pump 76 and compressed into a bi-phase liquid steam mixture. This is then expelled into the condenser 58 for further distilling into a liquid state. The condenser 58 may be surrounded by water from the feed source for cooling. The condenser 58 can be additionally cooled by secondary cooling sources from electrical cooling, water cooling or common air-cooled condensers.

The steam exhausted from the inner chamber 24 is routed through the manifold 40 and to the condenser 58. In one disclosed embodiment, the steam may be routed through the heat exchanger 46 to communicate thermal energy to pre-heat water for the next batch of water to be sanitized. The heat exchanger 46 may also transfer thermal energy into other systems. In the condenser 58, the steam is transformed back to a liquid form and stored in the storage tank 60 to accumulate water for distribution.

The disclosed system 20 utilizes the sealed inner chamber 24 and sealed outer chambers 26 to apply variable pressures and temperatures to intake water drawn into the inner chamber 24. The controlled vacuum pump 42 varies internal pressures P1, P2 in each chamber 24, 26 to adjust conditions to transform water into steam. The hollow tube 25 defining the inner chamber 24 has the transparent portion 66 to direct solar energy 68 that is magnified and focused by the lens 36. The remainder of the inner chamber 24 surfaces have a reflective coating 72 to reflect light and minimizing radiant heat loss. The thermal energy generated and provided in the inner chamber 24 is therefore more than sufficient to boil the water off without further input of power.

Figure 5:
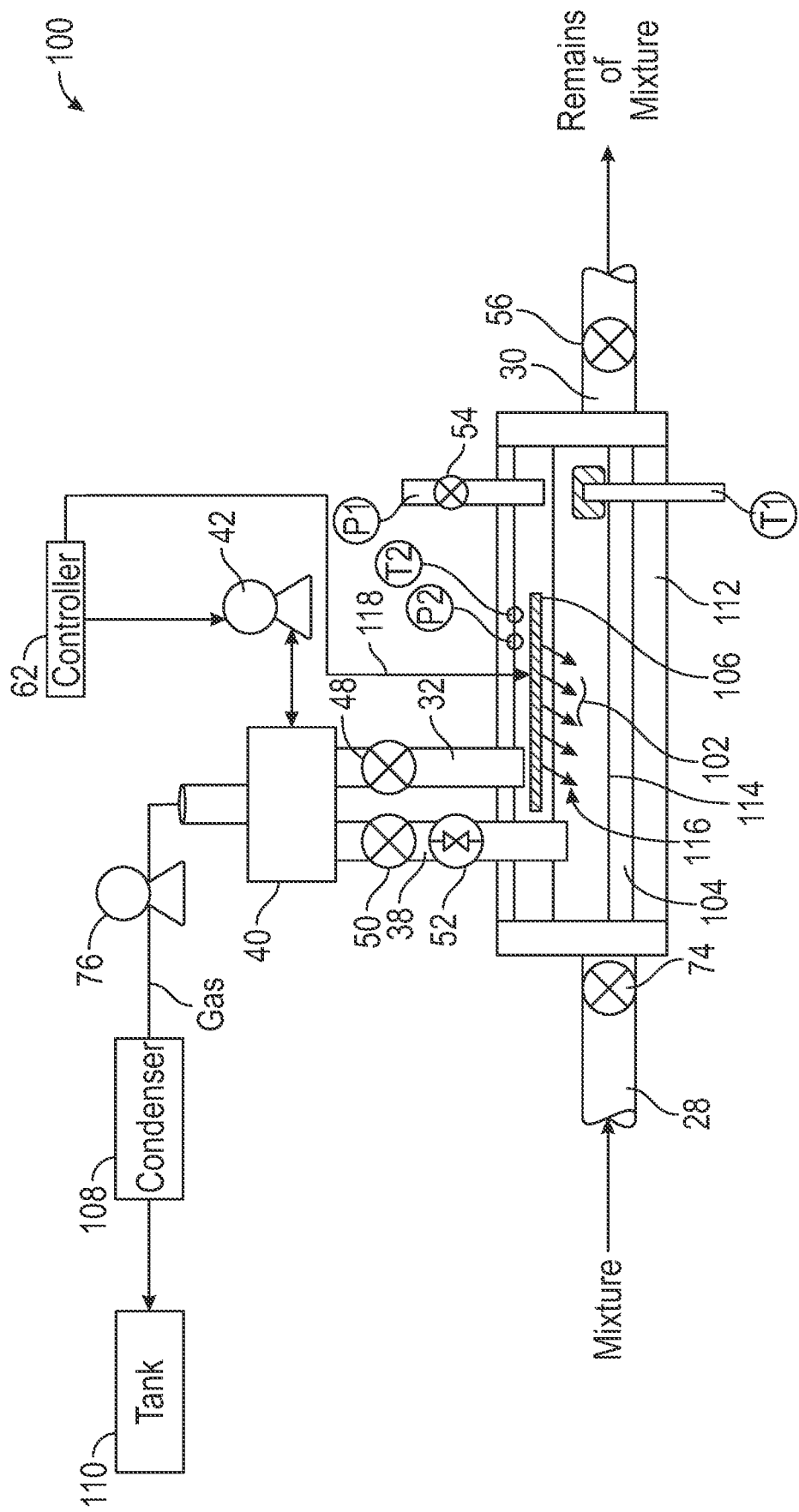
FIG. 5 is a schematic view of an example liquid separation device.
Figure 6:
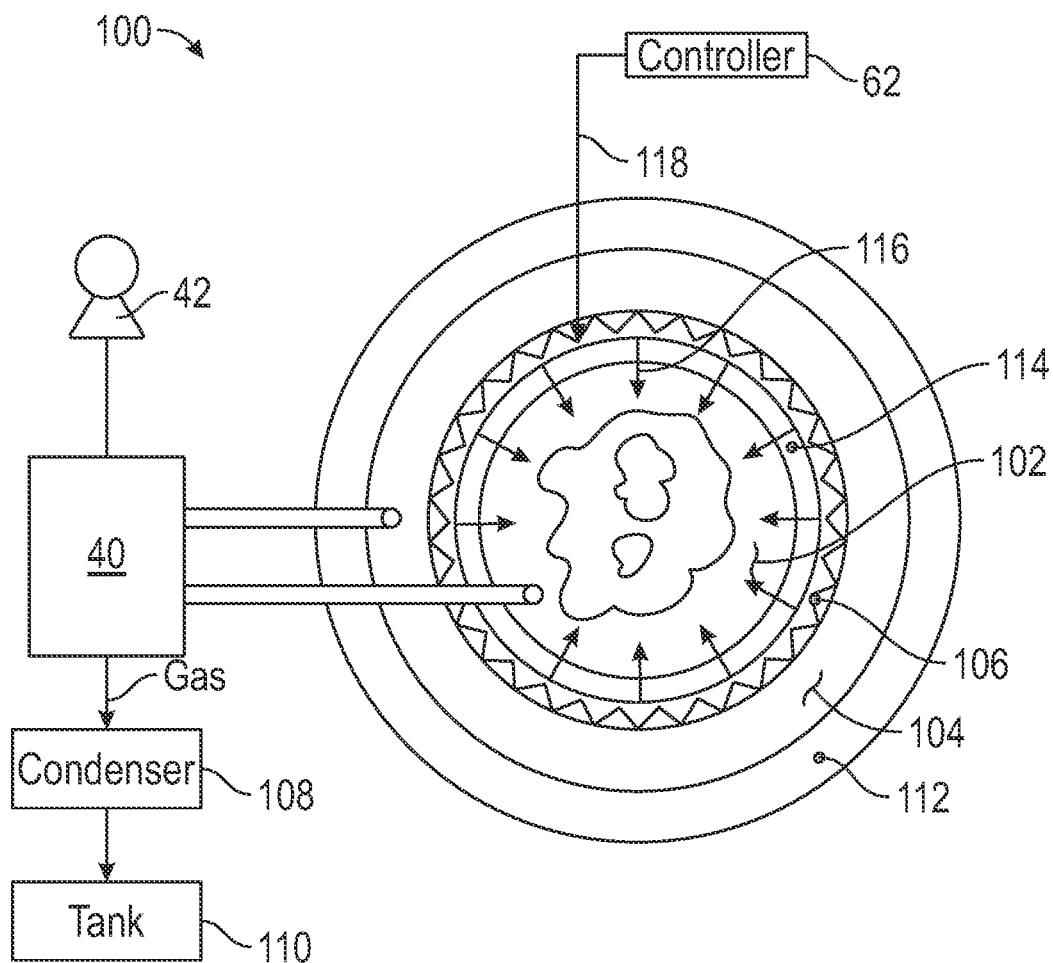
FIG. 6 is a cross-sectional view of the example liquid separation device shown in FIG. 5.

Referring to FIGS. 5 and 6, an example liquid separation device is schematically shown and indicated at 100. The device 100 includes an inner tube 114 defining an inner chamber 102 and an outer tube 112 surrounding the inner tube 114 and defining an outer chamber 104. The inner chamber 102 is configured to receive a liquid containing mixture. The liquid containing mixture ma includes several different liquids with different boiling temperatures, liquid and solid contaminant mixtures or a combination of different liquids and solid contaminants. The device 100 provides for separation of a liquid or liquids from the mixture. As appreciated, one of several different liquids could be separated from other liquids and/or solid contaminants.

The example separation device 100 includes manifold 40 and vacuum pump 42 along with the appropriate valving systems to generate a vacuum in each of the inner chamber 102 and thee outer chamber 104. The vacuum level in each of the inner chamber 102 and the outer chamber 104 may be different and are controllable separately.

A heating device 106 is supported and/or attached to an outer surface of the inner tube 114. In one disclosed example embodiment, the heating device 106 is powered by electric power schematically indicated at 118 and controlled by the controller 62. The heating device 106 communicate thermal energy 116 to the liquid mixture within the inner chamber 102. Th heating device 106 may include heat generating electric conductors in thermal contact with the inner tube 114. The inner tube 114 may be formed from a heat conducting material to aid in transferring thermal energy into the inner chamber 102.

The outer chamber 104 is defined around the inner tube 114 within the outer tube 112. The outer tube 112 may be formed of any material capable of accommodating the pressure and temperatures encountered during operation.

In one operational example embodiment, a mixture of liquids or liquids and solids is fed into the inner chamber 102. The inner chamber 102 is then sealed and a vacuum drawn to lower the pressure. The lower pressure provided by the vacuum provides for a lower boiling temperature of the liquid within the inner chamber 102. If the mixture includes multiple liquids, the boiling temperature of the desired liquid is utilized to transform that selected liquid into a gas. The gas is removed by the pump 76 and condensed back into a liquid form by a condenser 108 and stored in a tank 110.

The manifold 40 along with the valves 48, 50 and 52 operate to control the pressure within each of the inner chamber 102 and the outer chamber 104 separately to create the conditions necessary to transform the liquid into a gas form. The heating device 106 is activated by the controller 62 to heat the inner chamber 102 to a temperature needed to transform the liquid into the gas form. Once the desired liquid is transformed into a gas form and removed from the inner chamber 102, the vacuum can be removed and the heating device turned off. Any content remaining from the inner chamber 102 may then be removed.

Alternatively, a secondary cycle may be run to remove a different liquid remaining within the inner chamber 102. The process may be repeated as needed until all the selected liquids are removed from the inner chamber 102.

Accordingly, the example disclosed systems 20, 100 provided for the separation and liquid from other compounds.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A liquid separating system comprising:
   an inner chamber including a liquid inlet, a gas outlet, and a discharge;
   an outer chamber disposed at least partially around the inner chamber;
   a heating device in thermal communication with the inner chamber; and
   a vacuum pump in communication separately with the inner chamber and the outer chamber, the vacuum pump configured for controlling pressure within the inner chamber separately from a pressure in the outer chamber for controlling conversion of liquid within the inner chamber to a gas,
   a manifold that is separately in fluid communication with both the inner chamber and the outer chamber, wherein the manifold is configured to separately place suction from the vacuum pump in fluid communication with the inner chamber and the outer chamber so as to independently control the pressure within the inner chamber separate from the pressure in the outer chamber, wherein liquid within the inner chamber is transformed into the gas by heat energy communicated by the heating device into the inner chamber and subsequently removed from the inner chamber.

2. The liquid separating system as recited in claim 1, wherein the heating device comprises an electrically powered heater.

3. The liquid separating system as recited in claim 2, wherein the heating device is mounted to an outer surface of the inner chamber.

4. The liquid separating system as recited in claim 3, wherein the inner chamber comprises a hollow tube for receiving and holding a liquid and the outer chamber is a structure that defines an open space at least partially around the hollow tube.

5. The liquid separating system as recited in claim 1, further comprising a thermal expansion valve in fluid communication with the inner chamber for controlling the pressure within the inner chamber.

6. The liquid separating system as recited in claim 5, further including a first control valve in fluid communication between the inner chamber and the vacuum pump for controlling the pressure within the inner chamber.

7. The liquid separating system as recited in claim 6, further comprising a second control valve in fluid communication with the outer chamber and the vacuum pump for generating a vacuum within the outer chamber.

8. The liquid separating system as recited in claim 7, further comprising a third a control valve in fluid communication with the discharge of the inner chamber.

9. The liquid separating system as recited in claim 1, further comprising a condenser for receiving a gas exhausted through the gas outlet of the inner chamber.

10. The liquid separating system as recited in claim 9, including a heat exchanger in thermal communication with the gas exhausted through the gas outlet of the inner chamber for transferring thermal energy into another medium.

11. The liquid separating system as recited in claim 1, wherein the heating device comprises a lens and the inner chamber and the outer chamber include transparent portions such that the lens may concentrate and direct solar energy through the transparent portions.

\* \* \* \* \*